April 1, 1941. T. PETERSEN 2,237,088
METHOD OF FORMING PIPE CUTTER WHEELS
Filed Oct. 7, 1938
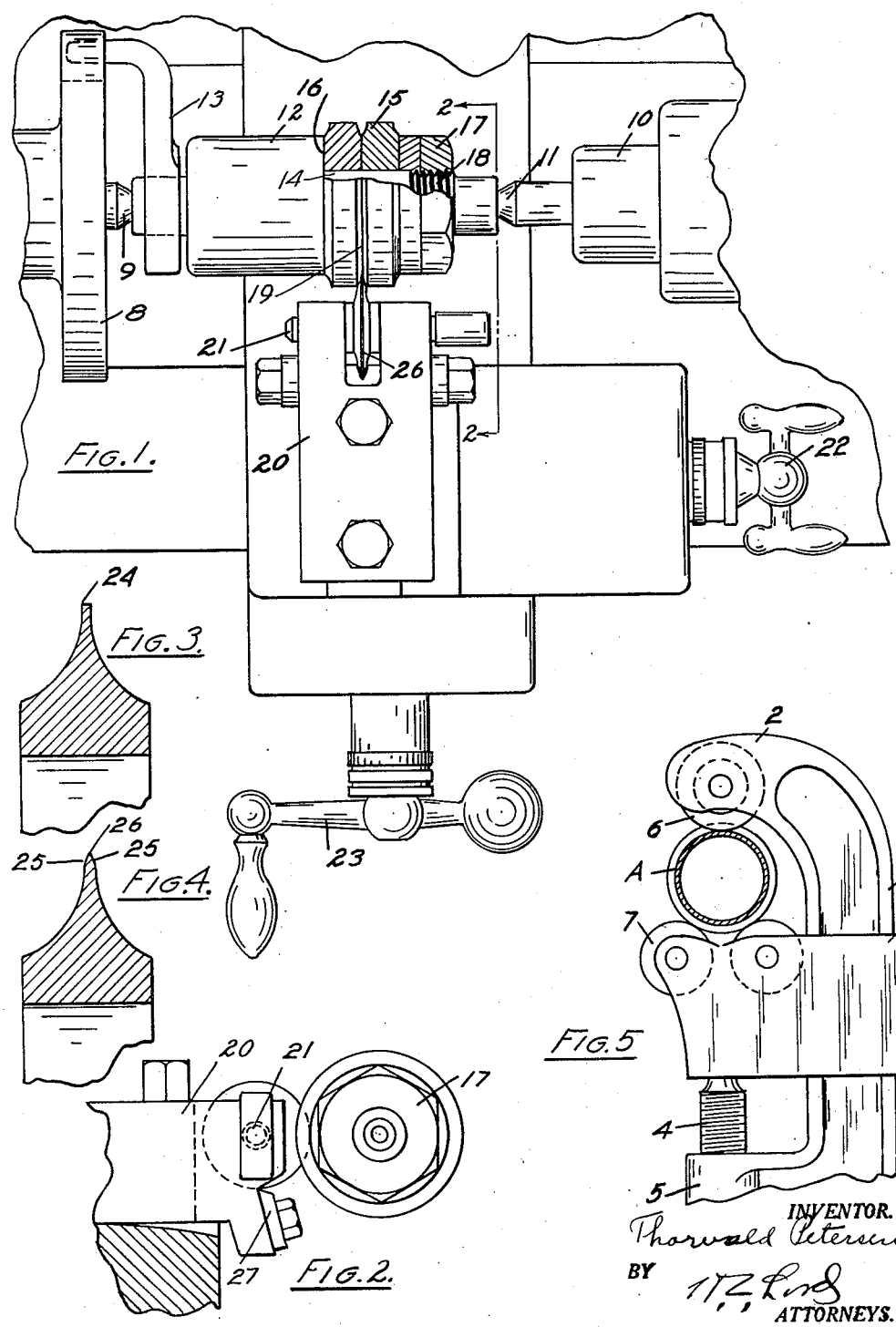
INVENTOR.
Thorwald Petersen
BY
ATTORNEYS.

Patented Apr. 1, 1941

2,237,088

UNITED STATES PATENT OFFICE 2,237,088

METHOD OF FORMING PIPE CUTTER WHEELS

Thorvald Petersen, Erie, Pa., assignor to Reed Manufacturing Company, Erie, Pa., a corporation of Pennsylvania Application October 7, 1938, Serial No. 233,810

3 Claims. (Cl. 76—89.2)

Pipe cutter wheels are subjected to very severe conditions. The cutting of the pipe is accomplished by forcing the wheel into the metal of the pipe. The cutting is accomplished largely by the flowing of the metal rather than by actual severing. The force required to operate the cutting tool and the rapidity of its penetration depends somewhat upon the smoothness of the engaging surfaces and the consequent amount of friction involved in the engagement.

In the present invention the cutting edge of the wheel is formed by a rolling action. This rolling action preferably not only shapes the engaging surfaces but also burnishes them. The preferable manner of accomplishing the rolling is to form the wheel with a slightly thicker edge than what is desired, and accomplish the shaping by reducing this thickness, thus expanding the wheel radially. In order that the wheel may be maintained in an exactly round condition it is preferably trimmed as it is rolled. The preferred method involves forcing the edge of the wheel slightly thicker than desired into a V-shaped rolling groove which compresses the wall axially and expands and finishes the edge in the radial direction. Features and details of the invention will appear from the specification and claims.

A preferred embodiment of the invention and the method by which it is produced is shown in the accompanying drawing as follows:

Fig. 1 shows a plan view of the apparatus by which the rolling is accomplished.

Fig. 2 a section on the line 2—2.

Fig. 3 an enlarged sectional view of the wheel blank.

Fig. 4 a similar view with the wheel rolled to its ultimate shape.

Fig. 5 a side elevation of a cutter with the wheel in place.

The cutter has the usual shank 1, nose 2, sliding block or head 3, adjusting screw 4 arranged in a projection 5 extending from the shank, wheel 6 mounted in the nose, roller 7 opposing the wheel and mounted in the sliding block 3. "A" marks the pipe being cut. Except for the wheel, these parts are of common construction.

The tool for forming the wheel involves a driven head or face plate 8, having a tool center 9, a tail stock 10 having a centering pin 11, a holder 12 mounted on and centered on the centers 9 and 11, a dog 13 secured to the holder and driven by the plate 8. The holder 12 has a spindle or reduced portion 14 carrying a roller 15. The roller is clamped against a shoulder 16 on the holder by a nut 17, the nut being operated on the screw 18 on the holder. The roller 15 has a V-shaped groove 19 approximating the ultimate shape of the engaging surfaces of the cutting edge of the wheel.

A tool post 20 has a pin 21 which forms a rotative mounting for the wheel to be formed. The post may be adjusted axially through the action of the handle 22 operating the usual adjusting screw (not shown), and may be forced forward and back through the operation of a handle 23 operating through the usual cross-feed screw (not shown).

The wheel blanks may be formed by any desired method but ordinarily through a screw machine operation providing a wheel of the usual size with an edge 24 having a cylindrical surface about 30 thousandths of an inch in thickness, as shown in Fig. 3. When the wheel is put in place and forced into the groove 19 the side edges engage the tapered walls of the groove and as the rolling progresses the engaging side surfaces of the wall 25 are brought to a more tapered shape causing the metal to form and flow radially, thus slightly increasing the size of the wheel as the rolling progresses, and forming the ultimate edge 26 of about 15 thousandths of an inch in thickness, as shown in Fig. 4. In order to take care of tolerances and perfect the rolling action the roll is trimmed by a cutter 27 carried by the post so that as the wheel is rotated the trimmer comes into action and thus assures proper rolling and a definitely round wheel.

As the wheel is rotated in the groove in its forming action, not only is the metal worked and thus improved, but the engaging surfaces of the cutting edge are burnished by the action of the walls of the groove upon these surfaces. Thus the wheel is provided with a surface made dense by the burnishing and rolling and also one of extreme smoothness so that as the wheel is forced into the pipe by the pressure of the screw of the pipe cutter, a smaller portion of the effort is lost through the friction in effecting the action.

What I claim as new is:

1. The method of forming pipe cutter wheels which consists in rolling the engaging surfaces of the edge of the wheel reducing the wall at the edge axially and expanding the same radially and trimming the periphery in relation to the rolling to produce a predetermined diameter of finished wheel.

2. The method of forming pipe cutter wheels which consists in rolling the engaging surfaces of the edge of the wheel reducing the wall at the edge axially and expanding the same radially, and trimming the wheel as it is rotated.

3. The method of forming pipe cutter wheels which consists in rolling the engaging walls of the cutting edge and shaping and burnishing the same through the rolling action by forcing the edge of the wheel into rotative engagement with the walls of a groove in a rotating roll, reducing the metal of the wall axially and extending it radially, and trimming the cutting edge as the wheel is rotated.

THORVALD PETERSEN.